March 9, 1943.  W. R. FREEMAN  2,313,232
BRAKE CONTROL MECHANISM
Filed Aug. 4, 1940
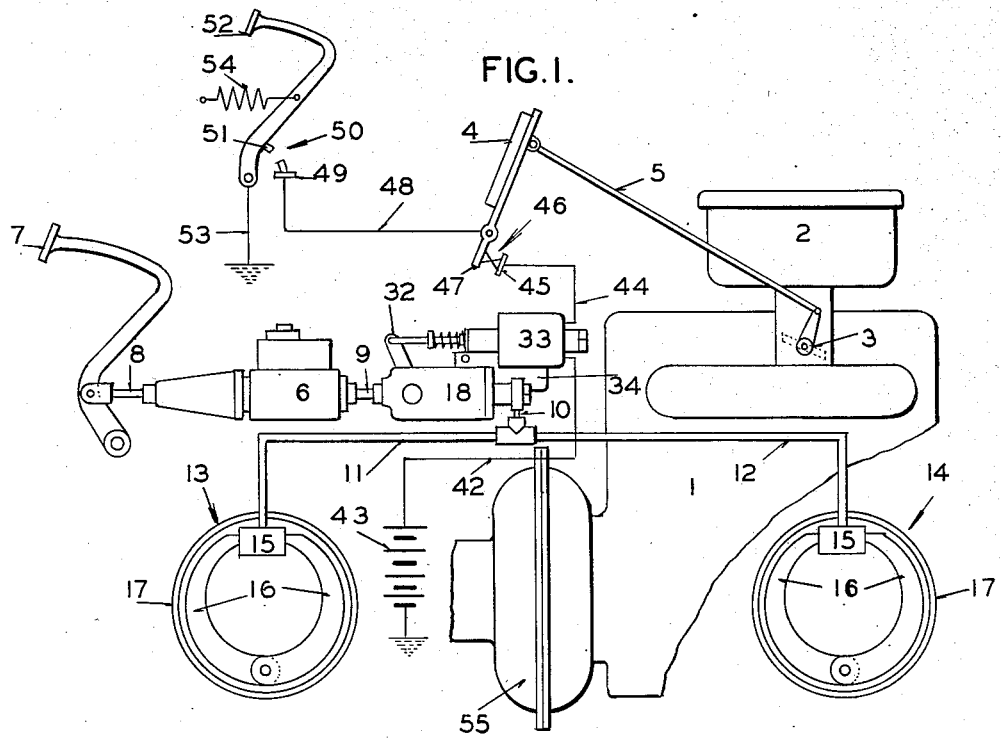
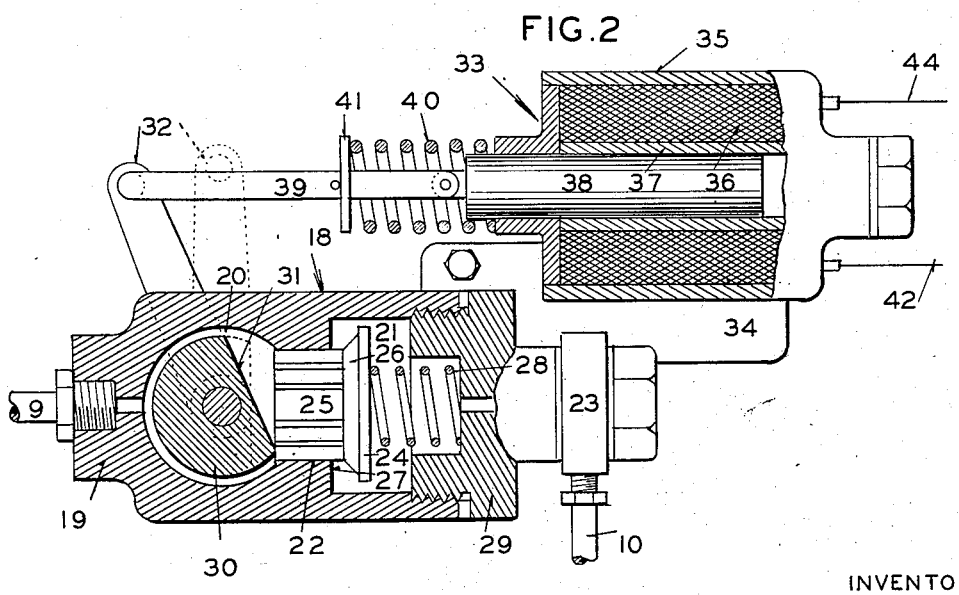
INVENTOR
W. R. FREEMAN
BY
ATTORNEY Patented Mar. 9, 1943

2,313,232

UNITED STATES PATENT OFFICE 2,313,232

BRAKE CONTROL MECHANISM

Walter R. Freeman, Clayton, Mo., assignor to Wagner Electric Corporation, St. Louis, Mo., a corporation of Delaware Application August 4, 1940, Serial No. 351,419

3 Claims. (Cl. 192—3)

My invention relates to brakes and more particularly to control mechanism for holding the brakes applied under certain conditions.

One of the objects of my invention is to provide holding means for a braking system and control means therefor which will permit the brakes to be held applied when the vehicle is stopped in any position and then only when the operator desires to have the brakes so held and which is also so arranged that the brakes can be automatically released when the vehicle is to be started from a stopped position.

A more specific object of my invention is to provide a fluid actuated braking system with a brake holding valve which can hold the brakes applied when the vehicle is in any position and so electrically control said valve that it will be placed in operative condition only when two switches are closed, one of which is adapted to be in closed position when the accelerator mechanism is in "off" position and the other or which is adapted to be closed by a special manually operated member.

Other objects of my invention will become apparent from the following description taken in connection with the accompanying drawing in which Figure 1 is a schematic view of a braking system and other parts of a vehicle having associated therewith my improved brake control means; and Figure 2 is an enlarged sectional view of the holding valve and solenoid for operating same.

Referring to the drawing in detail, I indicates a vehicle engine having the usual carburetor 2 controlled by a throttle valve 3 for varying the amount of gasoline fed to the engine. The valve is actuated by an accelerator pedal 4 pivoted in the operator's compartment of the vehicle and connected to the valve by a rod 5. The engine drives the wheels of the vehicle through the usual change speed gearing, propeller shaft and differential gearing as is well known.

The braking system of the vehicle is schematically shown and comprises a master cylinder 6, the piston (not shown) of which is actuated by the brake pedal 7 and piston rod 8, said pedal being mounted in the operator's compartment of the vehicle. The outlet of the master cylinder is connected by conduits 9 and 10 and branch conduits 11 and 12 to supply fluid under pressure to actuate the braking units 13 and 14 (two only being shown). Each of these units comprises an actuating fluid motor 15 for the brake shoes 16 whereby the shoes may be moved into engagement with the drum 17 secured to the wheel.

In accordance with my invention, I interpose between conduits 9 and 10, a brake holding valve 18 whereby fluid under pressure can be trapped in the fluid motors of the braking units and thus maintain the brakes applied under certain conditions. As shown in detail in Figure 2, this holding valve comprises a casing 19 provided with two chambers 20 and 21 communicating with each other by a passage 22. The chamber 20 is connected to conduit 9 leading from the master cylinder and chamber 21 is connected by means of a suitable fitting 23 to conduit 10 leading to the fluid motors of the brakes. A valve element 24 is positioned in chamber 21 and is provided with a fluted valve stem 25 guided in the passage 22 and projecting into chamber 20. This valve element carries a rubber or like member 26 for engagement with a seat 27 surrounding the end of passage 22. The valve element is normally biased toward a seated position by means of a light spring 28 interposed between the valve element and a plug 29 closing chamber 21. Journaled in the valve casing and positioned in chamber 20 is a shaft 30 having a cam surface 31 for cooperation with the end of valve stem 25 which projects into chamber 20. The outer end of the shaft has secured thereto an arm 32 for rotating the shaft.

In the valve construction just described when the shaft 30 is in the position shown, valve 24 will be maintained open and fluid under pressure may flow freely past the valve in either direction. When shaft 30 is rotated in a clockwise direction to the dotted line position, cam 31 will permit the valve element 24 to be seated under the action of spring 28. Under these conditions, if there is any fluid under pressure in the fluid motors, it will be maintained therein since it cannot return to the master cylinder. If there is no fluid pressure in the fluid motors, fluid under pressure can be forced past the valve since it unseats in the direction of flow of fluid to the brakes. The fluid admitted to the fluid motors will then be trapped.

The means I employ to control the valve is a solenoid 33 which is mounted adjacent the valve 18 and on the same bracket 34 which supports said valve. This solenoid comprises a casing 35 in which is positioned a coil 36 surrounding cylindrical member 37 which receives the armature or plunger 38. This plunger is connected to the arm 32 of shaft 30 by rod 39. A spring 40 is interposed between casing 35 and a washer 41 on rod 39 to normally maintain arm 32 and shaft 30 in the position shown wherein the valve element 24 will be normally held open.

The circuit for controlling the solenoid is shown in Figure 1. One end of the coil is connected by a conductor 42 to the grounded battery 43 and the other end of the coil is connected by a conductor 44 to a stationary contact 45 of a switch 46. The other and movable contact 47 of this switch is carried by the accelerator pedal 4 and is so associated with said accelerator pedal that when the pedal is in "off" position, the switch will be closed and when the accelerator pedal is depressed to open the throttle valve, the switch will be opened. The movable element 47 of said switch is connected by a conductor 48 to a fixed element 49 of a second switch 50. The movable element 51 of this second switch is mounted on a pedal 52 and connected by means of a conductor 53 to ground, thereby completing the circuit. The pedal 52 is normally biased by spring 54 to a position where the switch 50 is open.

The pedal 52, in accordance with my invention, is an additional pedal positioned in the operator's compartment of the vehicle for convenient operation by the left foot of the operator. The present trend of automobile manufacturers is to eliminate the clutch pedal and to so construct the transmissions that it is not necessary to disconnect the engine from the driving wheels of the vehicle as would be possible, for example, when the transmission embodies a fluid coupling of the Föettinger type, as shown at 55. The brake control system is well adapted for such an equipped automobile as the pedal 52 can take the place of the eliminated clutch pedal.

In operation, when the vehicle is brought to a stop and it is desired to prevent the vehicle from moving without maintaining the foot on the brake pedal, as for example, where the vehicle is facing either upwardly or downwardly on an inclined roadway or where the vehicle is subject to a "creep" due to the operative presence of a fluid coupling, this can be accomplished by moving pedal 52 to close switch 50. Since the vehicle is stopped, the accelerator pedal will be in its "off" position and, therefore, the switch 46 is closed. Thus the electrical circuit is closed and the solenoid energized. The energization of the solenoid will cause plunger 38 to move to the left and so position the shaft 30 and cam surface 31 that the valve element 24 will be moved to closed position under the action of spring 28. This will cause fluid under pressure to be trapped in the fluid motor and the brakes be held applied, if they are already applied. If they are not applied they can be so conditioned since fluid under pressure can pass the valve element 24 by inserting it. The operator is now free to remove his foot from the brake pedal and use it for any other purpose desired, as for example, starting the engine if the engine is dead or placing it on the accelerator pedal preparatory to starting the vehicle.

When it is desired to start the vehicle, the brakes will be automatically released by depressing the accelerator pedal to speed up the engine during the starting operation. It is not necessary to release the pedal 52 to open the switch 50 since the circuit will be broken by the opening of switch 46 when the accelerator pedal is depressed. Thus the operator need not coordinate any opening of a switch with the depressing of the accelerator pedal to start the vehicle since this is accomplished by the same foot due to the movable element of switch 47 being mounted to move with the accelerator pedal.

When a vehicle is equipped with the brake control means just described, the brakes can be held applied at the will of the operator to thus prevent the vehicle from moving whenever conditions are such that the vehicle will move from stopped position. The operator has sole control over maintaining the brakes applied when the vehicle is stopped and he obtains this condition by depressing the pedal 52 to close switch 50. With the brake control means there is no danger of the brakes being held applied when the vehicle is moving because even if the accelerator pedal is released, the solenoid cannot be energized except by the special operation of moving pedal 52. This pedal is preferably conveniently positioned so as to be operated solely by the left foot of the operator and does not in any way interfere with the operation of the brake pedal and accelerator pedal which are controlled by the right foot. As before mentioned, the brake control means is found to be very useful on vehicles which are provided with a fluid coupling. If the coupling should be the cause of any "creeping" when the vehicle is stopped, the brakes can be maintained applied to prevent such and then automatically released when the vehicle is started.

Being aware of the possibility of modifications in the particular structure herein described without departing from the fundamental principles of my invention, I do not intend that its scope be limited except as set forth in the appended claims.

Having fully described my invention, what I claim as new and desire to secure by Letters Patent of the United States is:

1. In a motor vehicle provided with a control member having a released "off" position employable coincidental with bringing the vehicle to a stop and an "on" position employable in moving the vehicle and with a fluid pressure-actuated braking system, a valve associated with the braking system for preventing release of the brakes from applied position, means including a solenoid for causing said valve to be closed when said solenoid is energized, an electrical circuit for said solenoid including two switches connected in series in the circuit, one of said switches being associated with the vehicle control member so as to be closed when the control member is in "off" position and automatically opened when said control member is operated to the "on" position, means for normally biasing the other switch open, and manual means independent of the braking system for closing the other switch at will, the closing and opening of said other switch having no effect on the operation of the prime mover of the vehicle.

2. In a motor vehicle provided with an engine having an accelerator mechanism and with a fluid pressure actuated braking system comprising a brake actuating motor, a source of pressure and conduit means for placing said source in communication with the motor, a valve associated with the conduit means for preventing return flow of fluid from the motor to the source, a solenoid for controlling said valve, an electrical circuit for said solenoid including two switches in series, one of said switches being associated with the accelerator mechanism so as to be closed when said mechanism is in "off" position and opened when said mechanism is operated to increase the speed of the engine, and manual means independent of the braking system for closing the other switch, said valve being so constructed and controlled by the solenoid that when the said solenoid is energized by the closing of both switches the valve will be caused to be closed and maintained closed regardless of the position of the vehicle on a roadway.

3. In a brake holding means for permitting an operator to hold the brakes applied when desired, the combination with a motor vehicle provided with an engine having an accelerator mechanism and with a fluid pressure actuated braking system comprising a brake actuating motor, a source of pressure and conduit means for placing said source in communication with the motor, of a valve associated with the conduit means for preventing return flow of fluid from the motor to the source, a solenoid for controlling said valve, an electrical circuit for said solenoid including two switches in series, one of said switches being associated with the accelerator mechanism so as to be closed when said mechanism is in "off" position and opened when said mechanism is operated to increase the speed of the engine, means for biasing the other switch to normally open position, and manually operable means comprising a member independent of any of the vehicle operating members and positioned in the operator's compartment for convenient operation by the left foot of the operator for closing said other switch, said valve being so constructed and controlled by the solenoid that when the said solenoid is energized by the closing of both switches the valve will be caused to be closed and maintained closed regardless of the position of the vehicle on a roadway.

WALTER R. FREEMAN.